United States Patent [19]

Tsai

[11] Patent Number: 5,418,644
[45] Date of Patent: May 23, 1995

[54] LIGHT FILTERING AND SHADING DEVICE FOR AUTOMOBILES

[76] Inventor: Huang-Chuan Tsai, No. 20, Lane 218, Nan Hsing Road, Chia I City, Taiwan, Prov. of China

[21] Appl. No.: 282,451
[22] Filed: Jul. 29, 1994
[51] Int. Cl.⁶ .............................. B60J 3/02
[52] U.S. Cl. .................... 359/601; 359/604; 296/97.4; 296/97.2
[58] Field of Search .......... 359/601, 602, 603, 609, 359/604, 611, 612; 296/97.2, 97.4, 97.7, 97.9, 97.11, 97.12

[56] References Cited

U.S. PATENT DOCUMENTS

| | | | |
|---|---|---|---|
| 2,220,429 | 11/1940 | Soderberg | 296/97.2 |
| 5,044,687 | 9/1991 | Abu-Shumats et al. | 296/97.4 |
| 5,076,633 | 12/1991 | Hsu et al. | 296/97.4 |
| 5,192,110 | 3/1993 | Mykutiuk et al. | 296/97.4 |
| 5,267,768 | 12/1993 | Tsai | 296/97.4 |

Primary Examiner—Loha Ben
Assistant Examiner—Mohammad Sikder
Attorney, Agent, or Firm—Morton J. Rosenberg; David I. Klein

[57] ABSTRACT

A light filtering and shading device for automobiles includes a parallel slide assembly having two parallel rods fitting through two slide bases for the slide bases to slide along, four locating bases fixed on the roof of an automobile and holding the two ends of the two parallel rods, two clamp bases combined with the two slide bases and clampingly fixed with an upper side of a filter plate to let the plate movable with the slid bases and pulled down to face the windshield from the roof. The filter plate has the upper and the lower side fixed with bent rubber slips with inner steel slips, and the right and the left side protected with wing plates covering the side edges and with anti-wear pieces put between to protect the filter plate and to prevent noises, and two sunshade plates directly fixed on the filter plate.

5 Claims, 14 Drawing Sheets

LIGHT FILTERING AND SHADING DEVICE FOR AUTOMOBILES

BACKGROUND OF THE INVENTION

This invention relates to a light filtering and shading device for automobiles, more particularly to one having a filter plate movably connected with two round rods simply installed on the roof of an automobile, two wing plates coveringly protecting the right and the left sides of the filter plate with anti-wear pieces put between to protect the filter plate and to prevent noises, and sunshade plate directly adjustably fixed on the filter plate.

Figure 18:
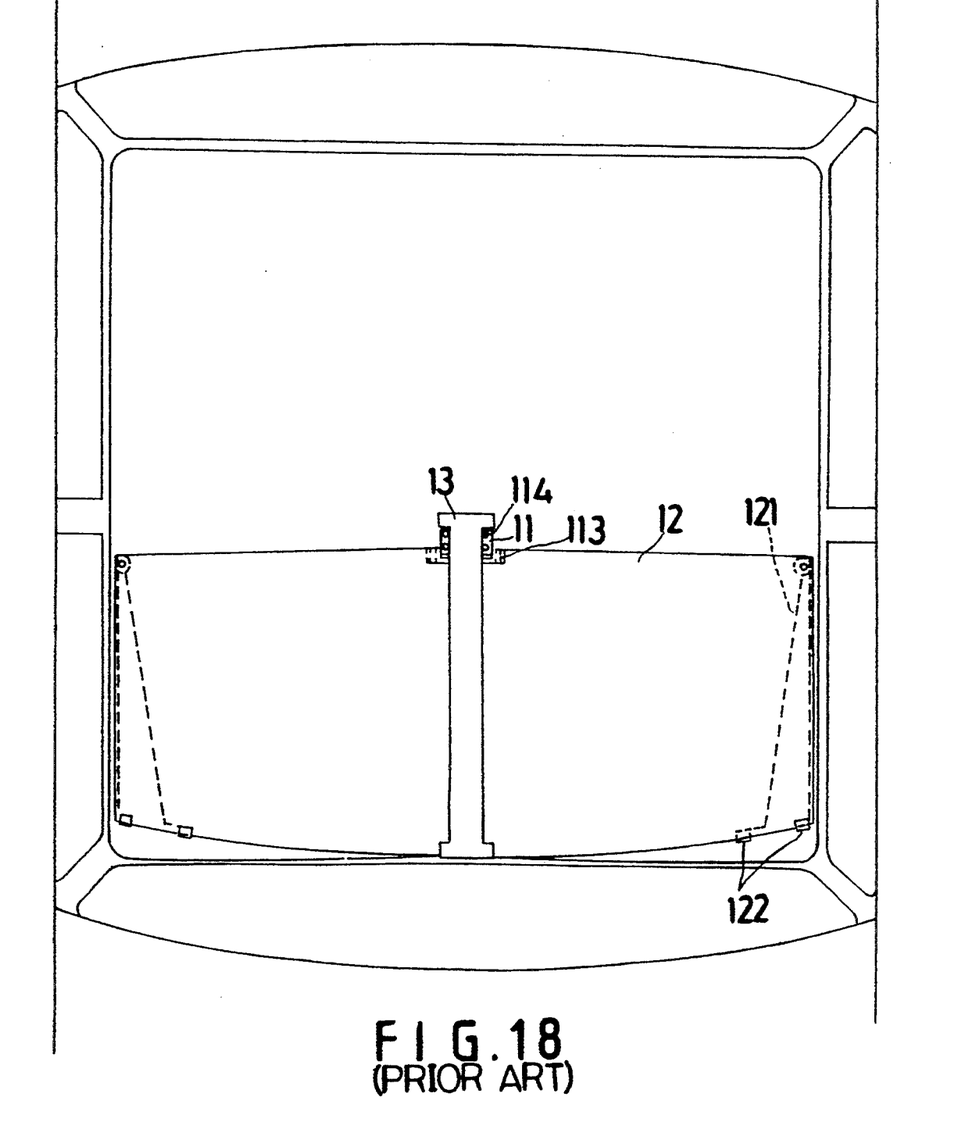
FIG. 18 is an upside view of the conventional light filtering and shading device deposited on the roof of an automobile.
Figure 19:
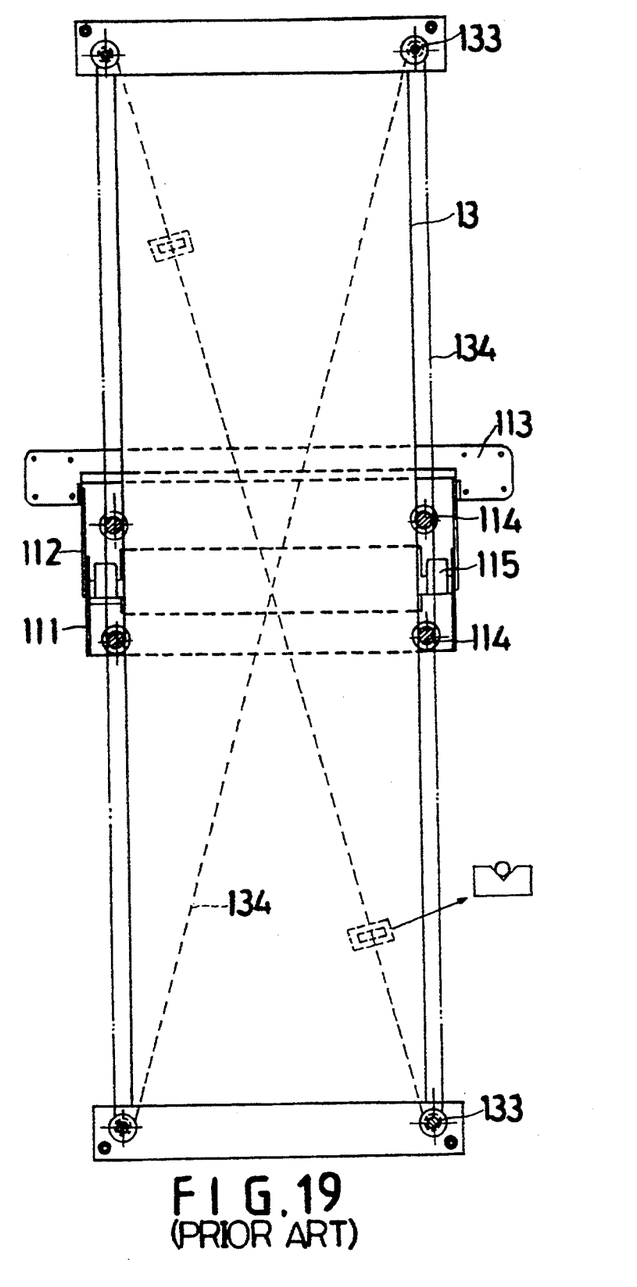
FIG. 19 is an elevational view of a flexible slide plate and a frame guide unit in the conventional light filtering and shading device.
Figure 20:
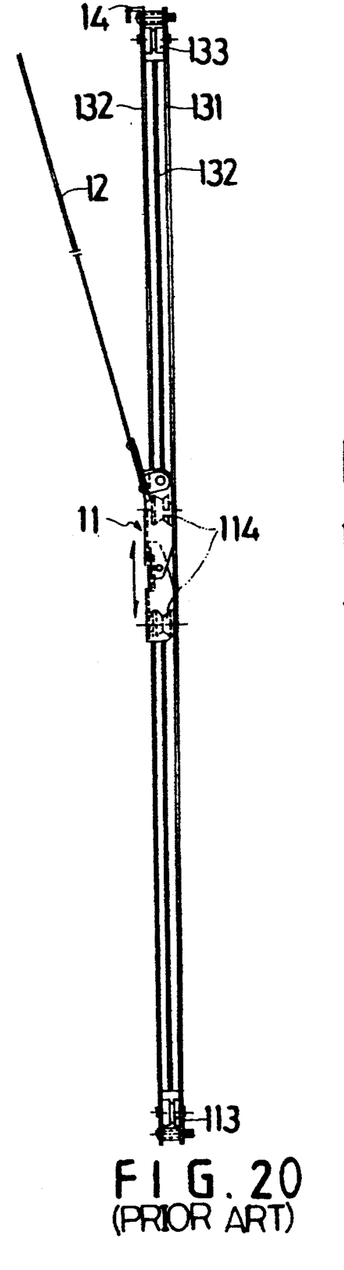
FIG. 20 is a side cross-sectional view of the slide plate and the frame guide-unit in the conventional light filtering and shading device; and, FIG. 21 is a side view of the conventional light filtering and shading device.
Figure 21:
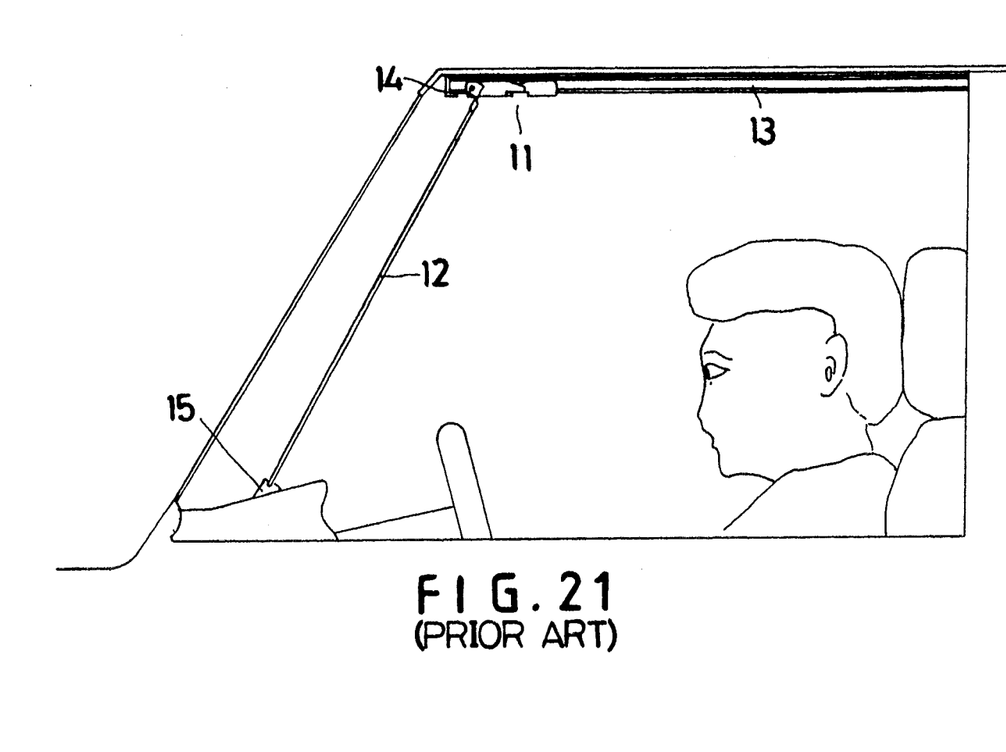

A known conventional light filtering and shading device for automobiles shown in FIGS. 17–21 includes a flexible plate 11, a filter plate 12, and a frame guide unit 13. The flexible plate 11 consists of two U-shaped guide plates 111, 112 pivotally connected together, a connecting plate 113 pivotally connected with a front end of the guide plate 111, four guide wheels located at four corners of the plate 11, and an elastic mall plate 115 provided on the connecting point of the two plates 111, 112. A filter plate 12 is directly connected firmly under the connecting plate 113 with screws, with two triangular wing plates 121, 121 pivotally connected with two opposite sides of the filter plate 12, several U-shaped blocks 121 fixed on the bottom edge of the wing plates 121, 121 as shown in FIG. 18. The frame guide unit 13 includes an upper and a lower fixing plates 131, 131 sandwiching a hollow guide plate 132 fixed with screws, wire slide wheels 133, 133 pivotally fixed between upper ends of the plates 131, 131 as shown in FIGS. 19, 20, a wire rope provided to wind around the wire slide wheels 133, 133, an L-shaped fixing frame 14 fixed at the front of the frame guide unit 13 and a support base 15 fixed on a gauge panel as shown in FIG. 21. When the filter plate 12 is to be used, the filter plate 12 is pulled down to face the windshield, and pushed up to be supported by the support base 15 in case of being not used.

However, this known conventional light filtering and shading device has disadvantages as follows:

1. The wing plates are directly screwed with the filter plate, being not strong enough and liable to be broken, and moving around to give rise to noise, and to harm the filter plate during running of the automobile.

2. The parallel slide assembly consisting of the flexible plat and the frame guide-unit is located at the middle portion of the filter plate, unable to slide smoothly or to be stuck in pulling the filter plate, because the filter plate is rather large but the slide assembly rather small. Besides, the filter plate may vibrate, move around, even to strike against the roof in case of large shock of the car body.

3. The sunshade plate may not be adjustable as it is located in front of the filter plate, after the plate is pulled down for use.

4. Its structure is too complicated, to a resultant high cost.

SUMMARY OF THE INVENTION

The object of this invention is to offer a kind of light filtering and shading device for automobiles improved to get rid of the drawbacks of the conventional ones.

The present invention includes four locating bases fixed on the inner surface of the roof of an automobile for supporting two parallel rods combined with two slide blocks sliding along the two rods, two clamp bases securing the upper side of a filter plate and combined with the two slide blocks to let the filter plate move with the slide blocks so that the filter plate may be pulled down from the roof to face the windshield. Two sunshade plates are fixed with the inner side of the. filter plate so as to be adjustable by a driver. The filter plate has an upper and a lower side protected by rubber slips with steel slips and the right and the left side protected by wing plates movable outward.

BRIEF DESCRIPTION OF THE INVENTION

The invention will be better Understood by reference to the accompanying drawings, wherein.

DESCRIPTION OF PREFERRED EMBODIMENTS

Figure 1:
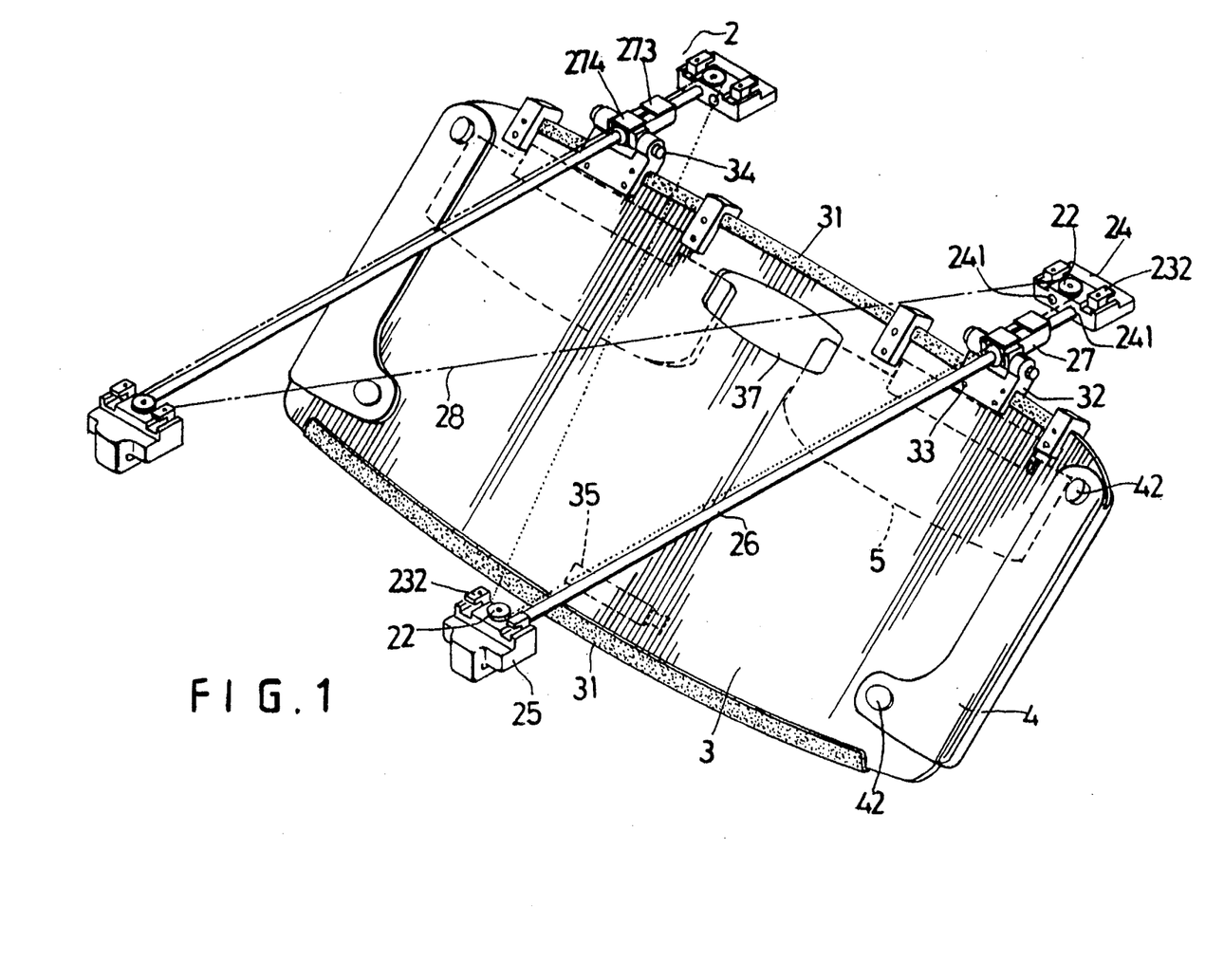
FIG. 1 is a perspective view of a light filtering and shading device for automobiles in the present invention.

A first embodiment of a light filtering and shading device for automoboiles in the present invention, as shown in FIG. 1, includes a parallel slide assembly 2, a filter plate 3, two wing plates 4, 4 and two sunshade plates 5, 5 as main components combined together.

Figure 2:
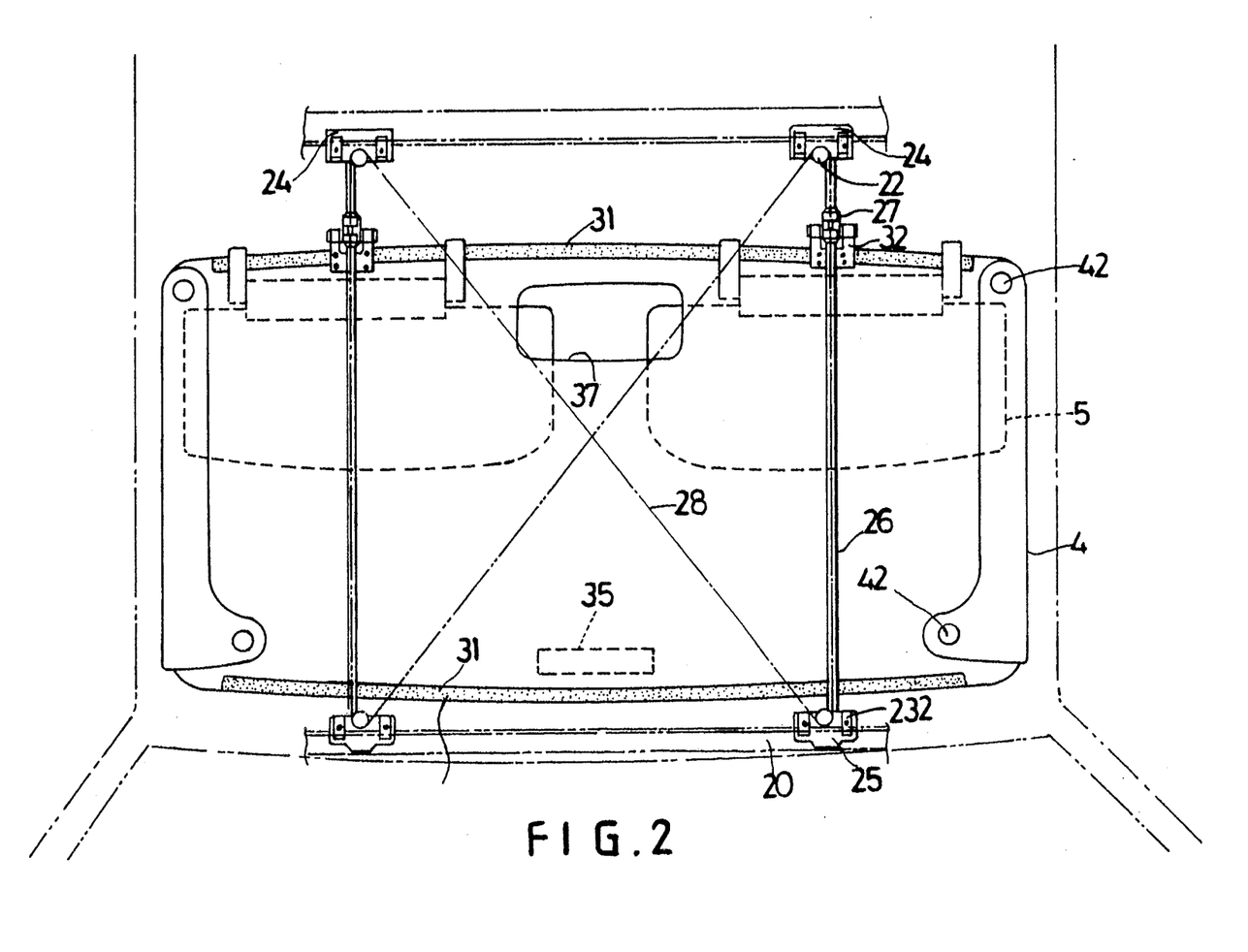
FIG. 2 is a front view of the light filtering and shading device for automobiles in the present invention, showning it fixed on the roof of an autmboile.
Figures 3, 8:
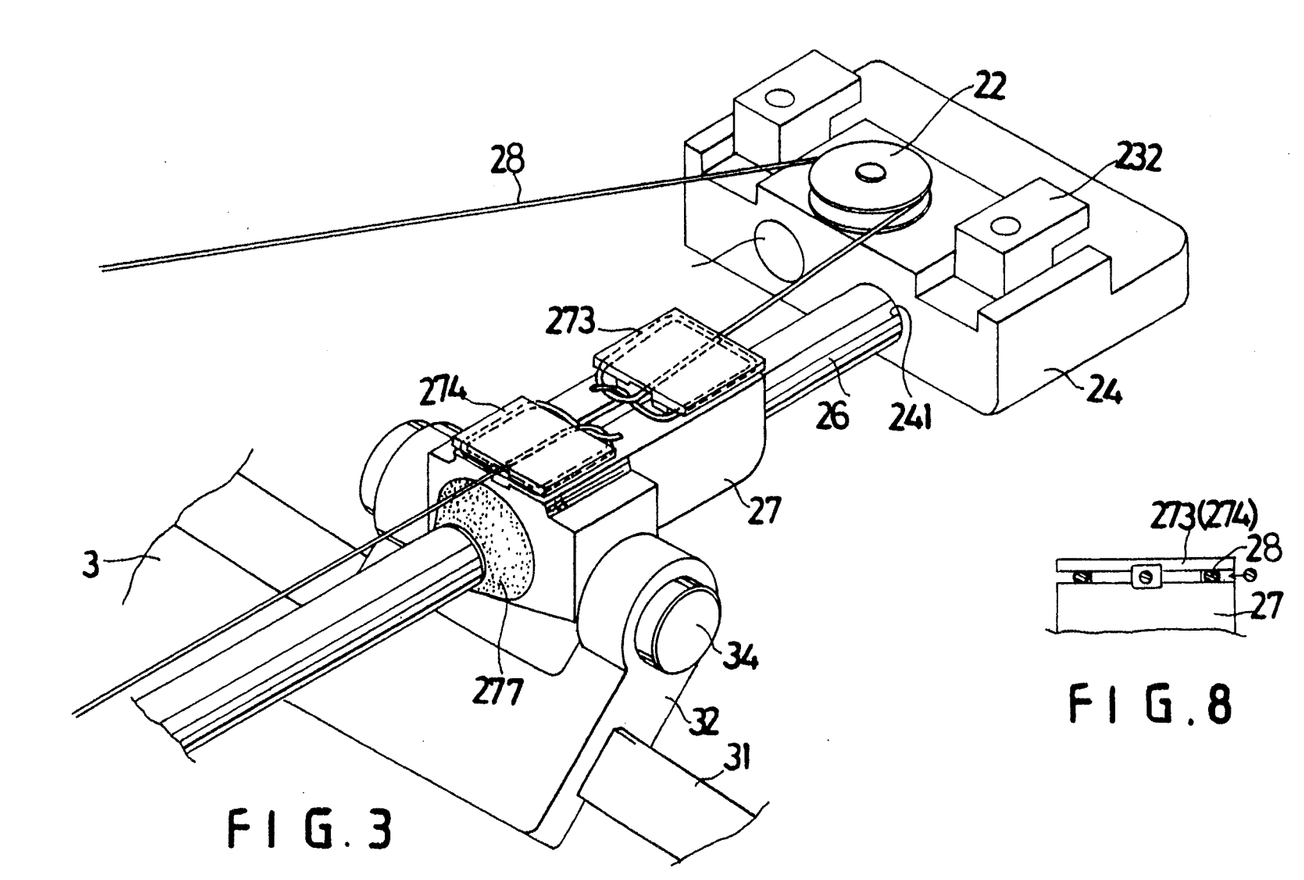
FIG. 3 is a partial perspective view of a parallel slide assembly, a filtering plate and a locating base of the light filtering and shading device for automobiles in the present invention.
FIG. 8 is a cross-sectional view of the slide base with a projecting small plate fixed thereon in the light filtering and shading device in the present invention.
Figures 4, 5, 6:
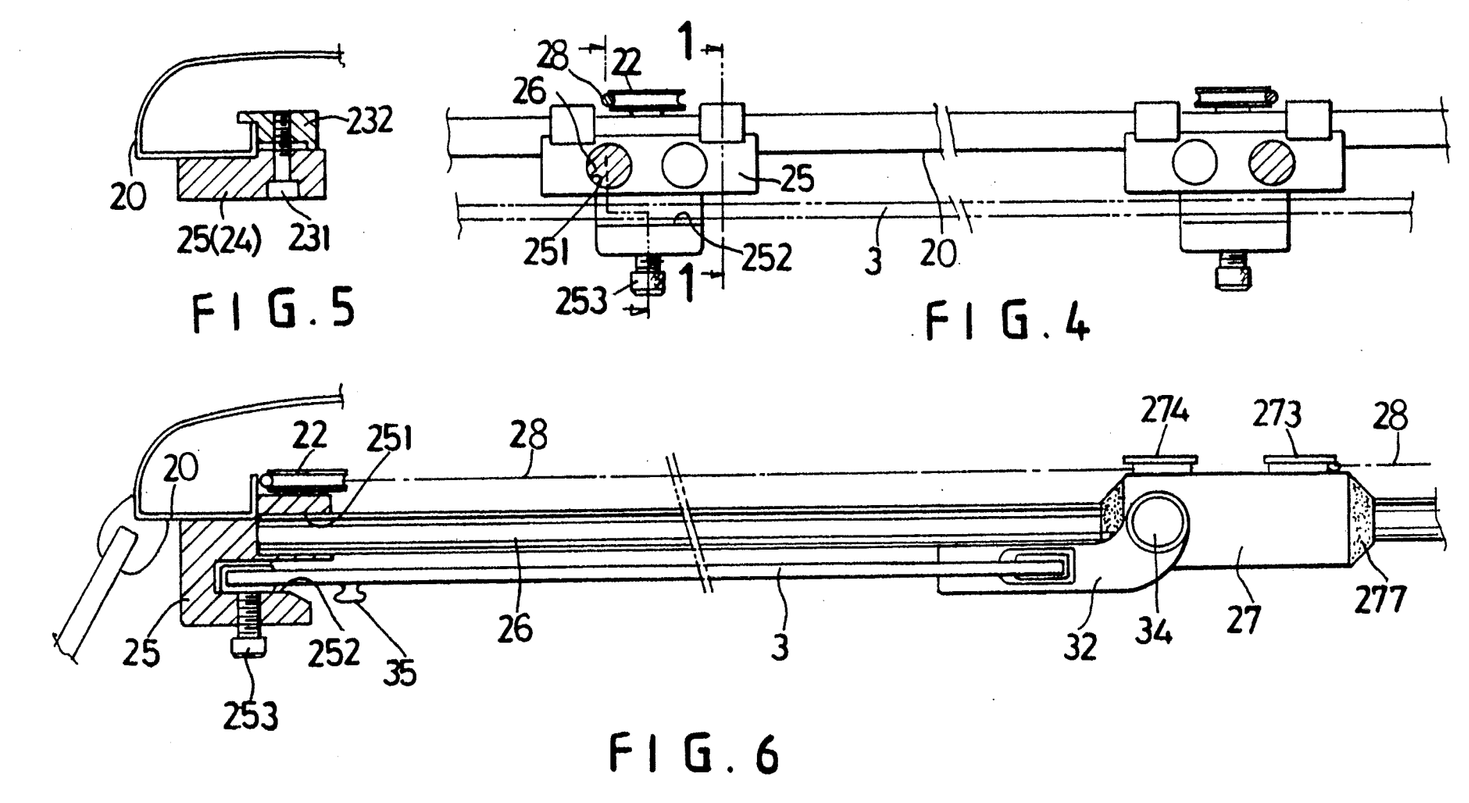
FIG. 4 is a front view of a locating base of the light filtering and shading device fitted in a C-shaped bar of the roof of an automobile in the present invention.
FIG. 5 is a cross-sectional view of line 1—1 of FIG. 4.
FIG. 6 is a side view of the light filtering and shading device for autombolies in the present invention.

The parallel slide assembly 2, as shown in FIGS. 1-7, for example to be used in a pickup truck, makes use of two C-shaped bars 20, 20 at the front and the rear portion of the truck, having two locating bases 24, 25 fixed on an opening edge of the C-shaped bars 20, 20 by means of bolts 231 screwing fitting blocks 232 on the opening edge as shown in FIGS. 4, 5 and 6. The locating bases 24, 25 have corresponding rod holes 241, 251 for the ends of two parallel elongate round rods 26 to fit and secured therein. The front locating bases 25, 25 each have a sidewise groove 252 in the lower poriton and a bolt 253 engaging through the bottom into the groove 252. A wire wheel 22 is respectively provided on an upper surface of each of the locating bases 24, 25. The slide assembly 2 also has two slide bases 27, 27 each provided with a lengthwise hole 271 for each of the elongate rond rods 26, 26 to fit through and a linear bearing 272 is deposited between the rod 26 and the inner wall of the hole 271. Each slide base .27, 27 has two square small plates 273, 274 with a linear recess, and two holes 275 aligned in two opposite sides of a rear portion, and an oilless bearing 276 fitted in each of the holes 275. Two steel wires 28, 28 are provided to wind around the two wire wheels 22, 22 in an intersection way, and fitted and secured firmly in the linear recesses of the two small plates 273, 274 on the slide bases 27, 27, with the recesses less deep than the diameter of the wires 28 so that the wires 28, 28 may be firmly caught immovable therein as shown in FIG. 8. A dust cover 277 is laid on each of the two opposite sides of the slide bases 27, 27 to let them slide smoothly along the rods 26, 26.

Figure 7:
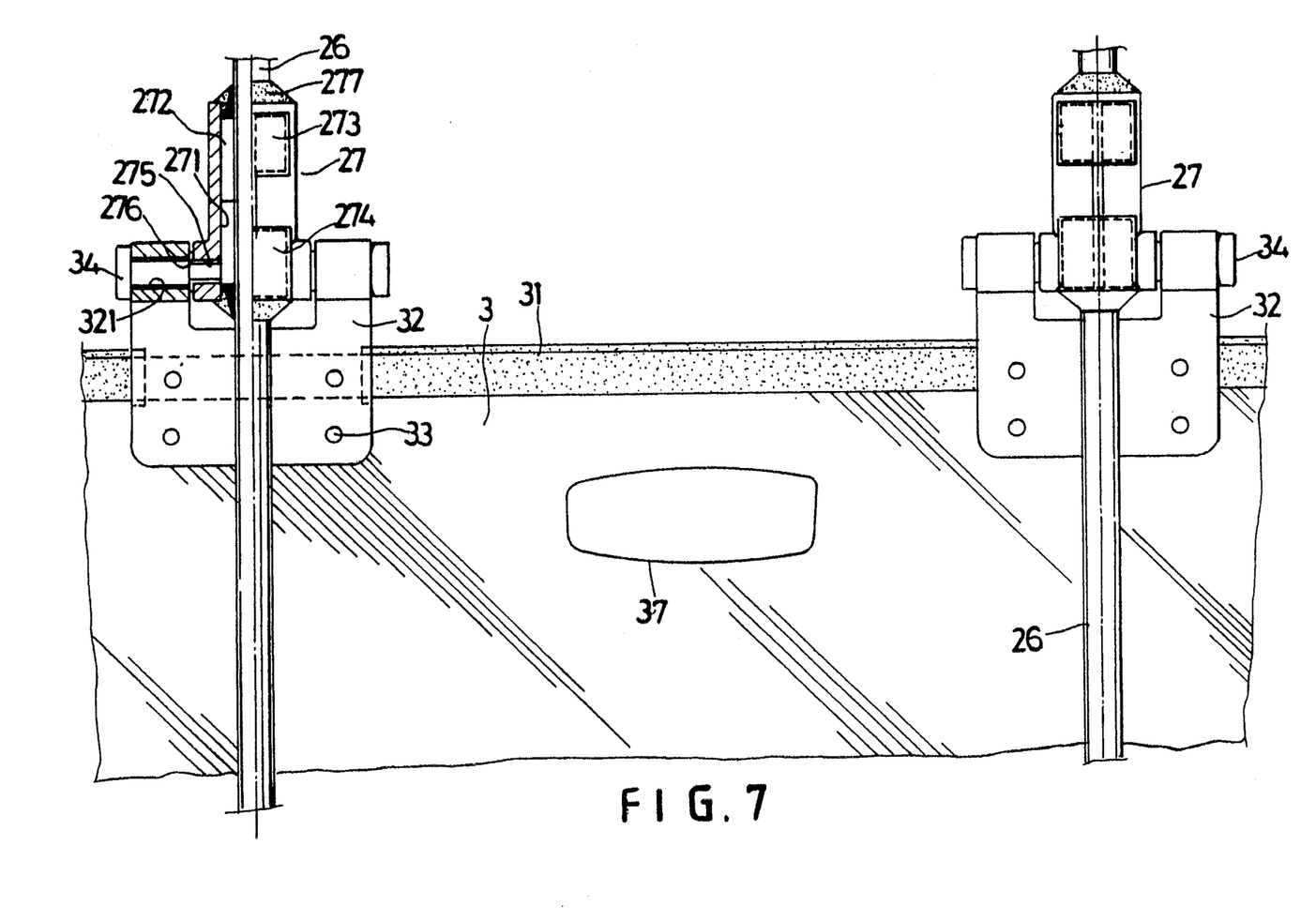
FIG. 7 is a front view of a filter plate combined with slide bases in the light filtering and shading device in the present invention.
Figure 9:
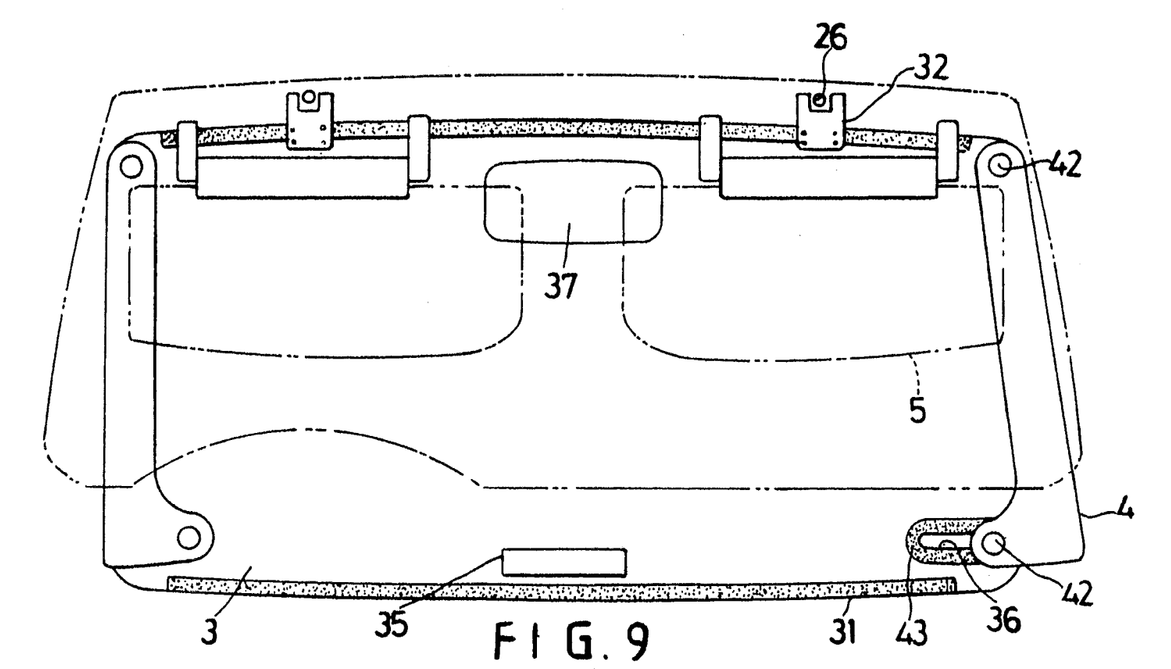
FIG. 9 is a front view of two sunshade plates with the filter plate in the light filtering and shading device in the present invention.

The filter plate 3, as shown in FIGS. 1, 2, 3, 6, 7, 9, is preferably shaped rectangular, having its upper side and its lower side fixed with a rubber bent slip 31, reinforced with a steel slip put inside for strengthening and preventing vibration and shock and keeping the curvature of the filter platform 3, a rectangular hole 37 in an intermediate upper portion for fixing a rearview mirror, and two lengthwise slots 36, 36 spaced in the bottom side. Two clamp bases 32, 32 are provided to catch hold of the upper side of the plate 3 by means of screws 33 as shown in FIGS. 3 and 7, having two threaded holes 321,321 in two opposite sides for threaded rods 34, 34 to engage to pivotally connect each of the clamp bases 32, 32 with each of the slide bases 27, 27 as integral. A pull block 35 is fixed at the bottom end of the plate 3, as shown in. FIG. 9.

Figure 10:
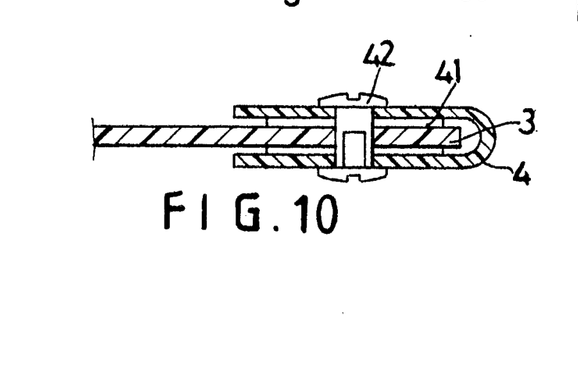
FIG. 10 is a cross-sectional view of the .upper portion of a wing plate connected with the filter plate in the light filtering and shading device in the present invention.
Figure 11:
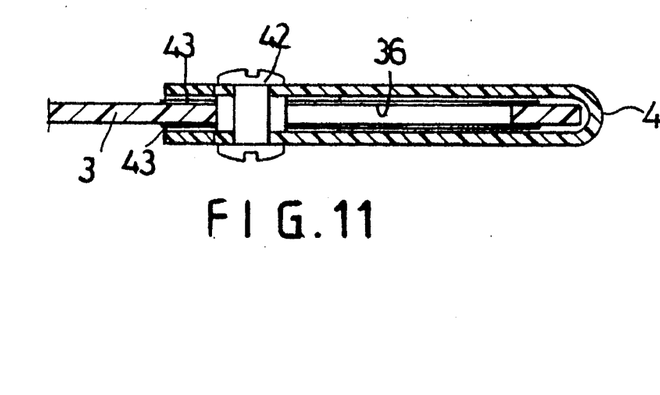
FIG. 11 is a cross-sectional view of the lower portion of the wing plate connected with the filter plate in the light filtering and shading device in the present invention.
Figure 12:
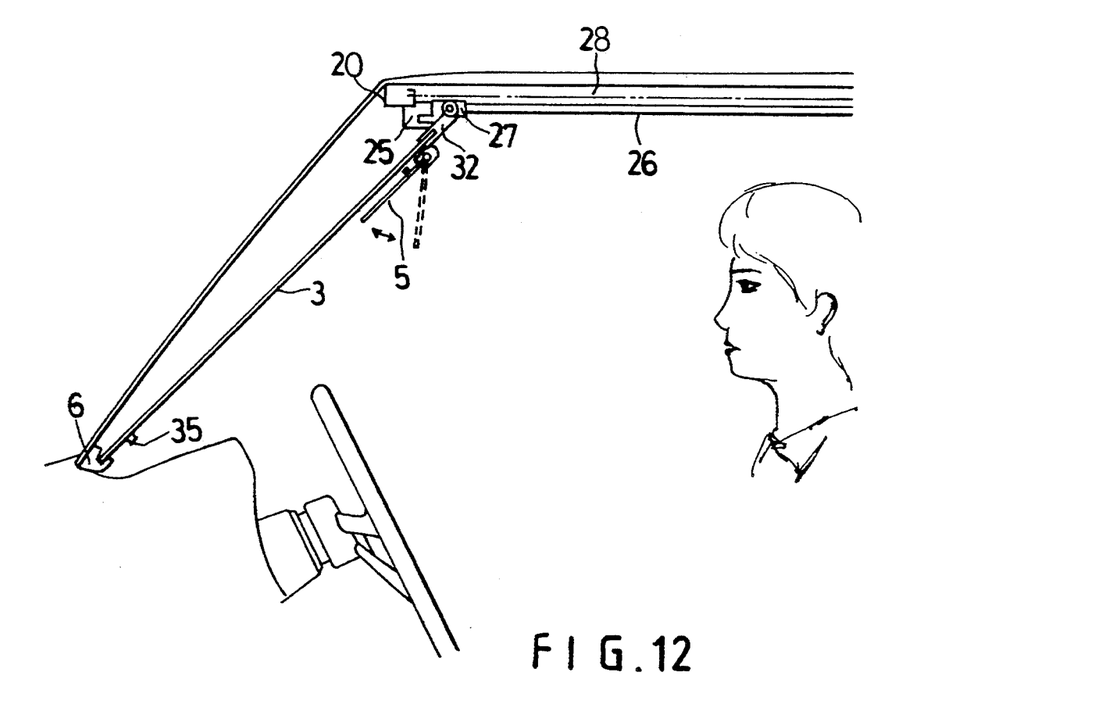
FIG. 12 is a side cross-sectional view of the sunshade plate pulled down in the light filtering..and shading device in the present invention.

The two wing plates 4, 4, as shown in FIGS. 1, 9, 10 and 11, have respectively a folded shape defining a narrow lengthwise groove to fit with a right and a left side portion of the filter plate 3, its upper inner portion placed with two anti-wear pieces 41, 41 between the two walls of the plate 4 sandwiching the filter plate 3 and pivotally secured by a securing means 42 as shown in FIG. 10. The lower inner portion of each of the plates 4 also has two anti-wear pieces 41 between the two walls of the plate 4 sandwiching the filter plate 3 and pivotally secured by a securing means 42 fitting through and movable in the slots 36 of the filter plate 3 as shown in FIG. 11, and consequently the wing plates 4, 4 can be pulled outward and retreated inward within the length of the slots 36 relative to the two sides of the filter plate 3 to increase a shading dimension of the sunshade plate 5.

The two sunshade plates 5 are a conventional sunshade plate, directly fixed firmly spaced on two opposite sides of the upper portions of the filter plate 3 with screws as shown in FIGS. 1 and 2 support block 6 is provided to be fixed at the bottom inner edge of the wind shield of the truck, having a groove for the bottom edge of the filter plate 3 to fit therein when pulled down.

In assembling, the filter plate 3 is pivotally combined with the slide bases 27, 27 of the parallel slide assembly 2 by the two clamp bases 31, 31, and the two wing plates 4, 4 combined with the two sides of the plate 3, and then the two sunshade plates 5, 5 are fixed on the two upper spaced sides of the plate 3.

Figure 13:
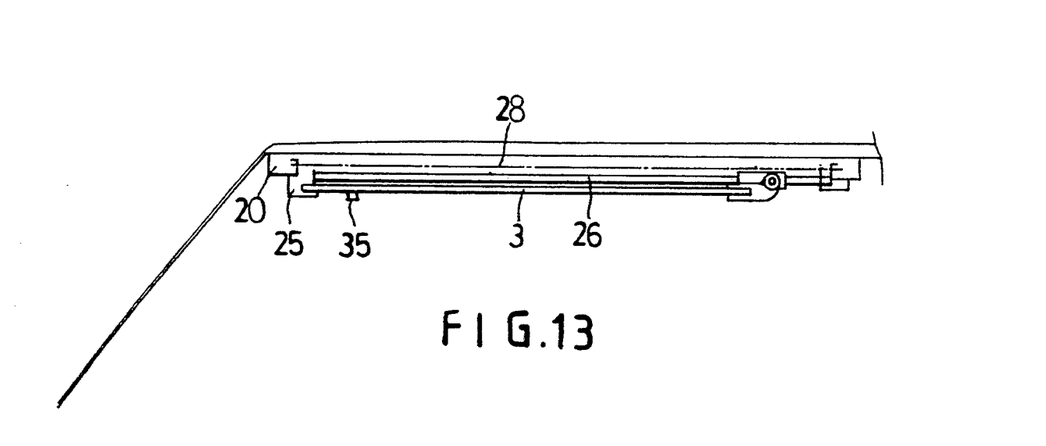
FIG. 13 is a side cross-sectional view of the filter plate pushed up and supported to the roof in the light filtering and shading device in the present invention.

In using, referring to FIGS. 2 and 13, the light filtering and shading device of the present invention is fixed on the two C-shaped bars of the roof of a pickup truck, or fixed directly on the steel plate of the roof of a car with bolts. Then the filter plate 3 is fitted in the groove 252 of the locating block 25 and secured in place by the urging bolt 253 in case of being not in use or in normal condition as shown in FIG. 6. Provided the sunlight is strong and should be filtered and shaded, the pulling block 35 is gripped and the filter plate 3 is pulled down to let the bottom fitted in the locating block 6, with the wing plates 4, 4 being pulled outward to increase shading dimensions and with the shade plates 5, 5 being possible to be adjusted for shading the sunlight.

Figure 14:
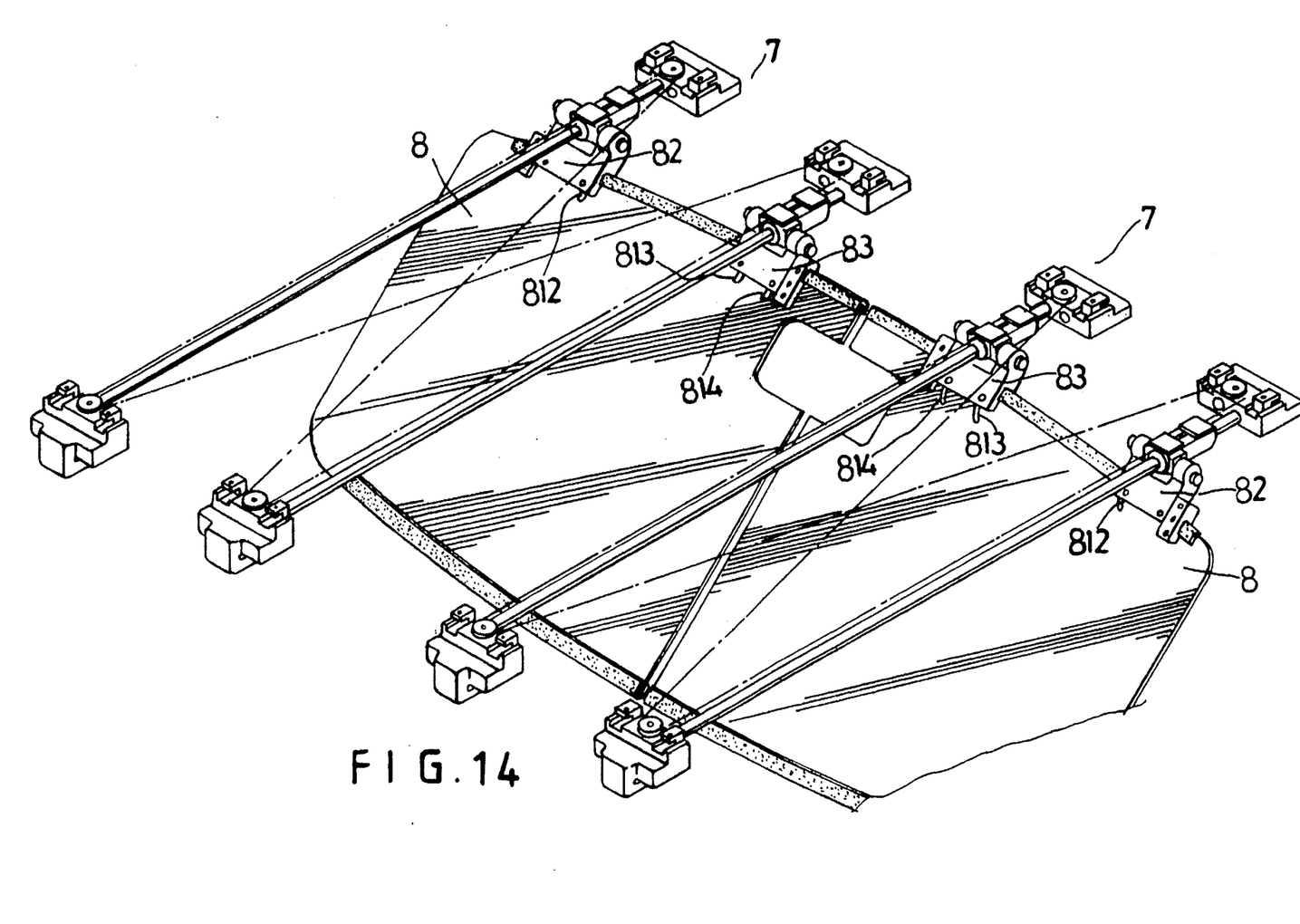
FIG. 14 is a perspective view of a second embodiment of the light filtering and shading device in the present invention.
Figure 15:
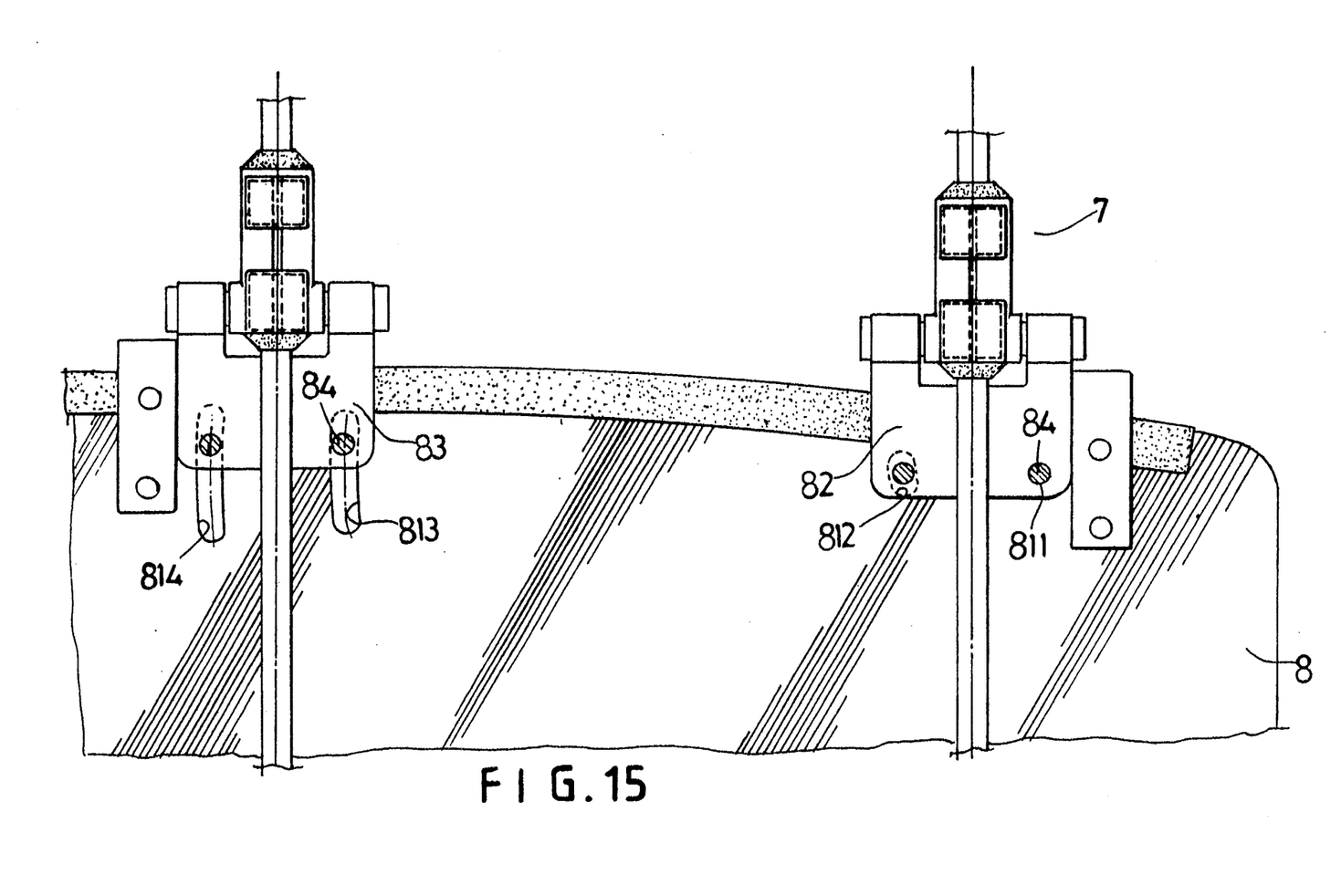
FIG. 15 is a partial front view of FIG. 14.
Figure 16:
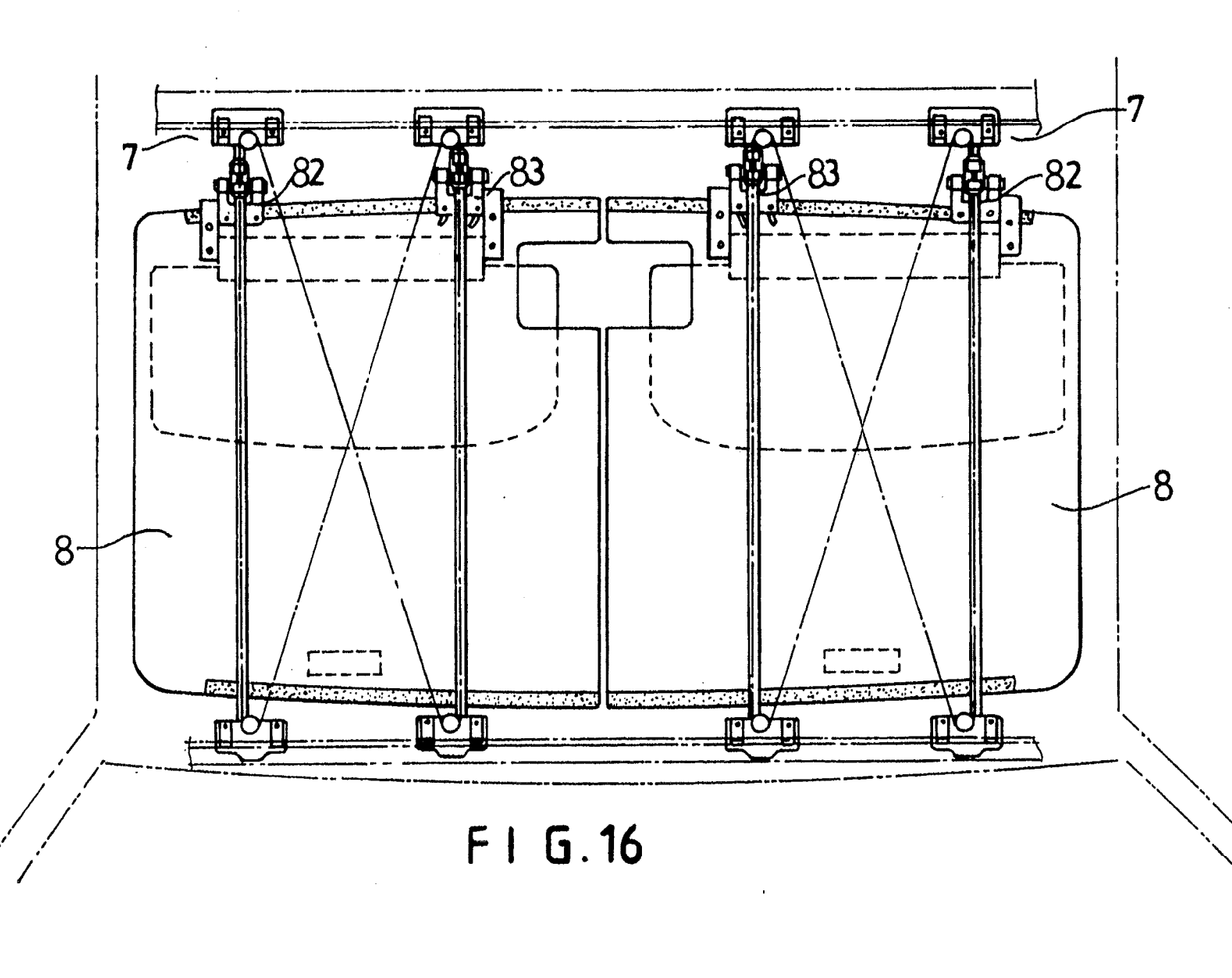
FIG. 16 is a lower side view of the second embodiment of the light filtering and shading device in FIG. 14.
Figure 17:
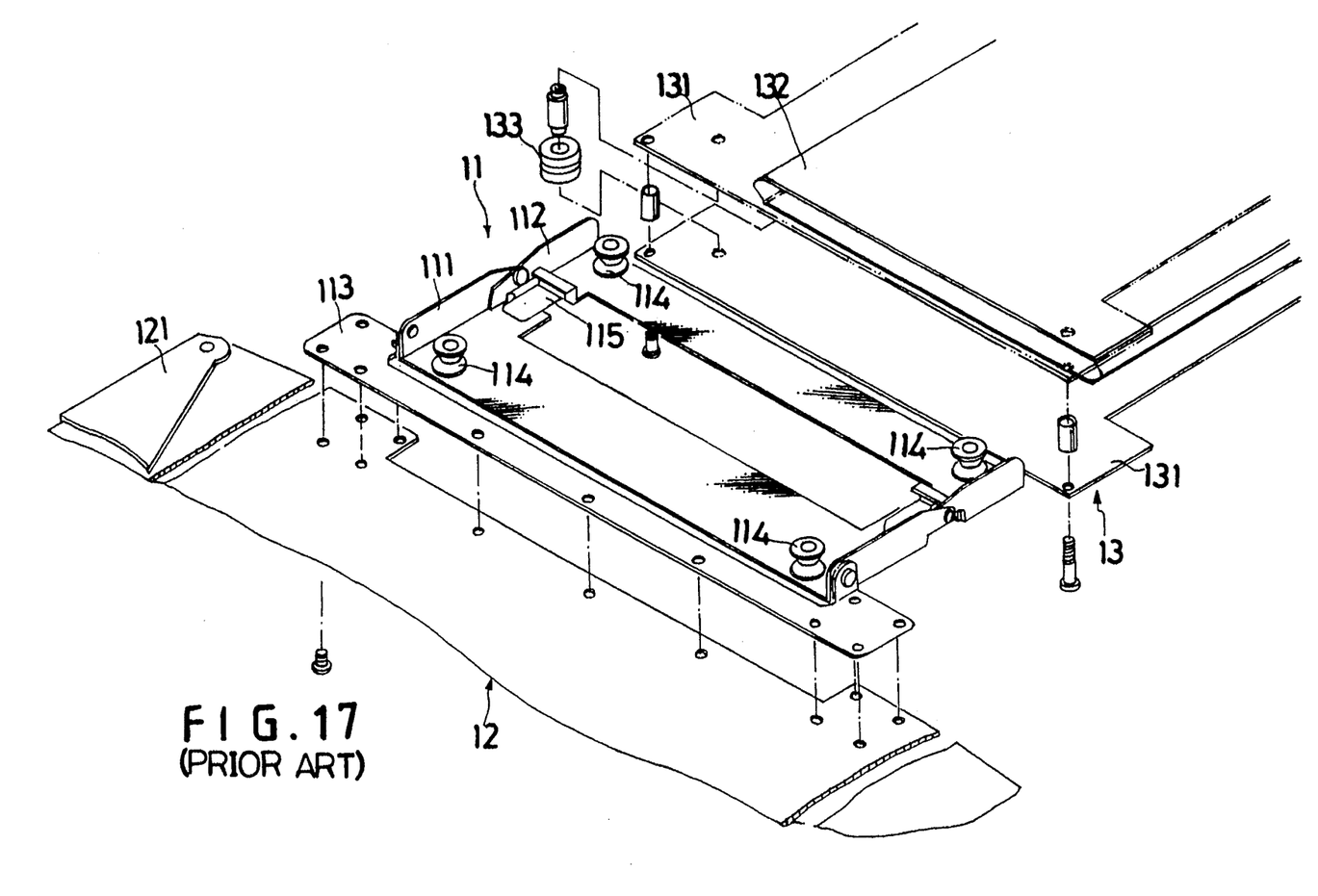
FIG. 17 is an exploded perspective view of a conventional light filtering and shading device.

A second embodiment of the light filtering and shading device for automobiles is shown in FIGS. 14, 15 and 16, having two sets of parallel slide assemblies 7, 7 instead of one set of the first embodiment, two filter plates 8, 8 additionally provided with three curved slots 812, 813, 814 on the three concentric circles formed with a round hole 811 as its center, and the three securing means 84 fitting through the slots 812, 813, 814 to combine the filter plates 8, 8 with two clamp bases 82, 83 of the two slide assemblies 7, 7 so that the two filter plates 8, 8 may be adjusted in its position, movable outward with the round hole 811 as a center, and thus possible to be fixed on an uneven roof of a car.

As can be understood from the description, this light filtering and shading device for automobiles has the follwoing advantages:

1. The filter plate is protected by the wing plates and anti-wear pieces are used to contact the filter plate, with the wing plates being secured with the securing means at the bottom of the filter plate, so that the filter plate is not to be harmed and or to cause vibrating noise caused in running of a car, without a fault of unstableness of a conventional light filtering and shading device.

2. The simple structure of the parallel slide assembly having two round slide rods for stably supporting the filter plate can let the filter plate slide smoothly and secure the filter plate stably, not to strike the roof of a car in spite of a large shock of the car, with help of the slide bases and the locating bases.

3. The sunshade plate is located behind the filter plate instead of at the front of the filter plate of a conventional light filtering and shading device for automobiles, possible to be adjsuted by a driver.

4. Its simpler structure than that of the conventional one can lessen its manufacturing cost.

While the preferred embodiments of the invention have been described above, it will be recognized and understood that various modifications may be made therein and the appended claims are intended to cover all such modifications which may fall within the spirit and scope of the invention.

What is claimed is:

1. A light filtering and shading device mounted to a roof of a vehicle comprising:
    (a) a pair of longitudinally extending and transversely displaced rod members, each of said rod members having a pair of C-shaped base members coupled to opposing longitudinal ends of said rod members, each of said C-shaped base members being secured to a roof frame of said vehicle and having a rotative pulley member mounted thereon;
    (b) a pair of slide base members respectively mounted on said rod members for sliding engagement therewith;
    (c) a pair of wire members extending around a diagonally displaced pair of said rotative pulley members and coupled to opposing longitudinal ends of each of said slide base members;
    (d) a pair of clamp base members, each of said clamp base members rotatively mounted to a respective one of said rod members;
    (e) a transversely extending filter plate member having a substantially rectangularly contoured opening formed therethrough for passage of a rear view mirror of said vehicle, said filter plate member being fixedly coupled to each of said clamp base members on opposing transverse ends thereof;
    (f) a pair of sunshade members rotatively coupled to each of said clamp base members adjacent a frontal surface of said filter plate member;
    (g) a pair of wing plate members pivotally coupled to opposing transverse end sections of said filter plate member for extending a light blocking area beyond opposing transverse edges of said filter plate member; and,
    (h) a support block fixed to a lower edge of a vehicle windshield, said support block having a groove formed therein for receipt of a bottom edge of said filter plate member.

2. The light filtering and shading device as recited in claim 1 including a pair of plate members, each of said pair of said plate members being fixedly secured to a respective one of said slide base members and longitudinally aligned each with respect to the other, each end of said wire members being secured to a respective one of said plate members, each of said slide base members having a longitudinally directed through opening for passage therethrough of a respective rod member and a linear bearing mounted within said through opening being sandwiched between said respective rod member and an inner wall of said slide base member defined by said through opening.

3. The light filtering and shading device as recited in claim 2 including a pair of dust covers mounted to a respective slide base member on opposing longitudinal ends thereof, each of said dust covers extending around a peripheral portion of a respective rod member.

4. The light filtering and shading device as recited in claim 1 including a pair of transversely extending rubber slip members respectively secured to an upper and a lower edge of said filter plate member for protecting said filter plate member edges from imparted force loads.

5. The light filtering and shading device as recited in claim 1 where said filter plate member includes a pair of transversely displaced arcuately contoured slots formed therethrough on opposing transverse ends thereof adjacent a lower edge of said filter plate member for sliding displacement of a respective wing plate member with respect to said filter plate member.

* * * * *